May 31, 1960 W. WINZENBURG 2,938,442

SLOTTED CYLINDRICAL SHUTTER FOR SMALL PHOTOGRAPHIC CAMERAS

Filed Nov. 29, 1957 3 Sheets-Sheet 1

INVENTOR
WILHELM WINZENBURG

May 31, 1960 W. WINZENBURG 2,938,442
SLOTTED CYLINDRICAL SHUTTER FOR SMALL PHOTOGRAPHIC CAMERAS
Filed Nov. 29, 1957 3 Sheets-Sheet 2

INVENTOR
WILHELM WINZENBURG

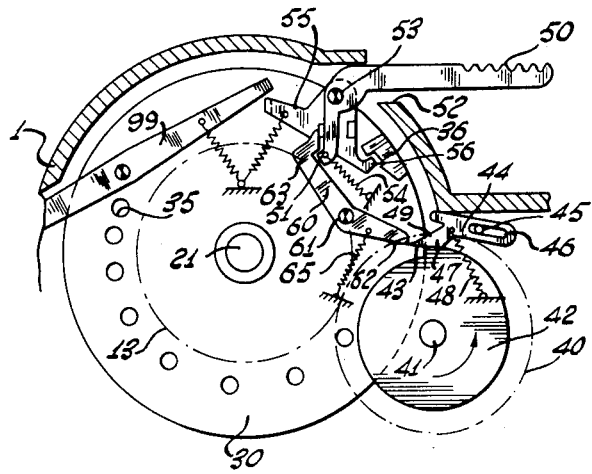
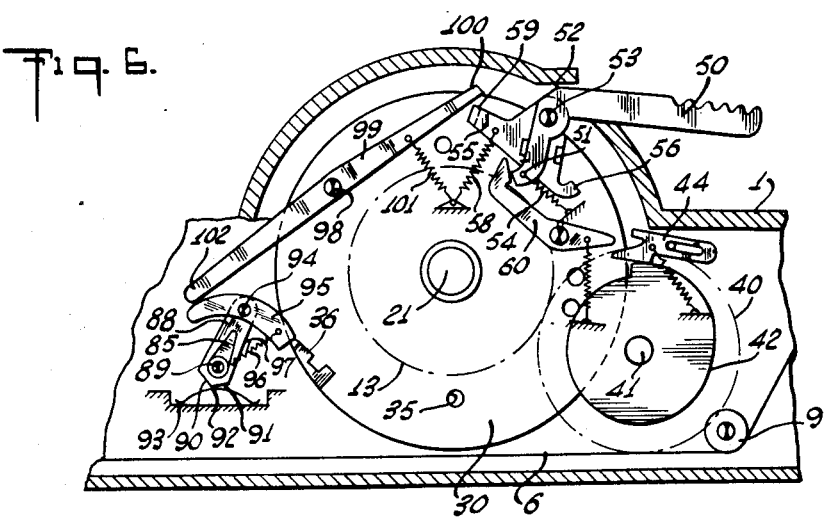

United States Patent Office 2,938,442
Patented May 31, 1960

2,938,442

SLOTTED CYLINDRICAL SHUTTER FOR SMALL PHOTOGRAPHIC CAMERAS

Wilhelm Winzenburg, Dresden, Germany, assignor to VEB Kamera- und Kinowerke Dresden Filed Nov. 29, 1957, Ser. No. 699,558

Claims priority, application Germany Dec. 1, 1956

8 Claims. (Cl. 95—31)

The present invention relates to a slotted cylindrical shutter for small picture cameras, and more particularly to a photographic camera shutter having two coaxially rotatable slotted cylinders within which are stationarily arranged optical means for the deviation of light rays.

Slotted cylindrical shutters, per se, are already known. In general, this term describes a system of at least two parallel cylindrical shells encased in one another, rotatably pivoted on the camera base, with the shutter bases toward the forward side of the camera, and with concentric window-like openings in the circumference of the shells. The shells are usually adjustable in relation to each other but also jointly rotatable. Small picture cameras are also known, in which the shutter forms a barrel surrounding the objective, and in which the shutter has two overlapping slots. In these former types, however, the rotational axis of the shutter cylinder lies perpendicular to the objective.

The main disadvantage of these known types of slotted shutter arrangements is that only a relatively small portion of the circumference of the cylindrical shutter, i.e. up to 90° of the total 360° circumference, is available for use in the shutter action movement. As a consequence, cameras with these prior types of slotted cylindrical shutters have a relatively narrow range between the shortest and longest exposure time settings possible.

Accordingly, an object of the present invention is to provide a novel and improved camera and shutter which obviates the above-mentioned and other disadvantages.

Another object of the invention is to provide means affording a wide range of exposure times.

Another purpose of the invention is to provide a structure which makes it possible to take advantage of a greater proportion of the circumference of a cylindrical shutter for exposure slot adjustment than was heretofore possible.

Still another object of the invention is to provide a cylindrical shutter through the wall of which light coming from the subject being photographed passes only once, thus resulting in a compact and efficient camera structure.

A further object of the invention is to provide means for facilitating the automatic setting of a shutter mechanism from the film winding action of a camera.

Other objects and many of the attendant advantages of this invention will be readily appreciated as the same becomes better understood by reference to the following detailed description when considered in connection with the accompanying drawings, wherein one embodiment is set forth and described in more detail.

In the drawings:

Fig. 5 is a view similar to Fig. 3 with the shutter mechanism in the wound or cocked position but with the lever for preventing double exposure in actuated position;

Fig. 6 shows the position of the shutter mechanism during a bulb time exposure, with the shutter release mechanism in depressed exposing position.

Figure 1:
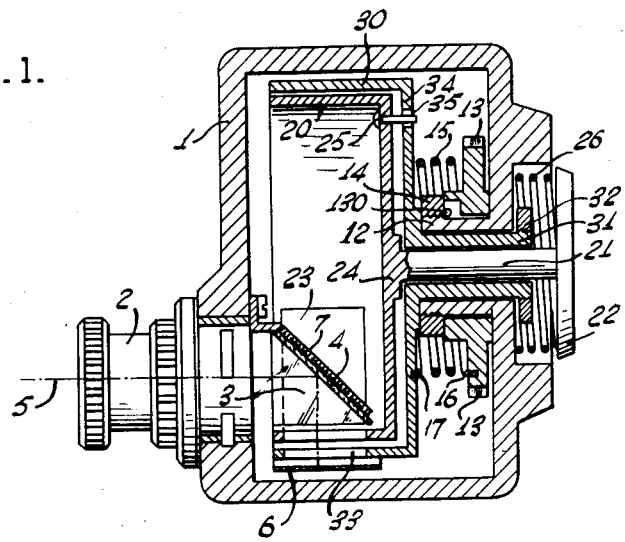
Fig. 1 is a sectional side view of a camera provided with a shutter according to the present invention, the shutter being shown in cross-section.

Briefly, the present invention includes two adjustable cylindrical shells, coaxially arranged so as to be rotatable in relation to each other and advantageously situated in a small picture-camera into which the incoming light from the subject being photographed enters from the forward side, and the light egress for the purpose of making the photographic exposure follows a path through openings in the cylindrical shells. According to the invention the light coming from the subject being photographed passes through the wall of each of the cylindrical shells only once.

Another feature of the invention is that the concentrically positioned cylindrical shells are so arranged that their axes lie parallel to the optical axis of the objective lens, and that the light rays coming from the subject matter being photographed are refracted or deviated, for passage through the cylindrical shells, through specular optical means, such as for example, a mirror or prism. By means of this novel arrangement, it is possible to take advantage of a full 180° of the circumference of the cylinders for adjustment of the exposure slot, producing an overlap of approximately 10°. Therefore, it becomes possible, without altering the return speed of the cylinder, entirely by changing the width of the slot, to very easily and exactly achieve a wide range of exposure times in various proportions from, for example, 1:100, or even as high as 1:340. Thus, by way of example, the smallest slit, which gives an exposure of approximately 1/1000 of a second is achieved with a 1.5 degree angle of rotation between the cylindrical shells, and the largest opening, which gives 1/10 of a second exposure, is achieved with a 150° angle. Another example using this novel arrangement makes it possible, entirely by changing the width of the slot, to achieve a proportionate adjustment range of exposure times of 1:340 by using a ½ degree angle of rotation between the cylindrical shells for the smallest slot opening and 170° angle of rotation between the cylindrical shells for the largest slot opening. By connecting one or more known types of retarding devices to reduce the return speed of the cylinder, still merely changing the size of the exposure slot opening, another, or when necessary, still a further group of exposure times can be achieved.

The present construction of the shutter and its arrangement with the camera and optical system makes it possible to derive the driving force for the setting or winding of the shutter in a very simple manner through an intermediate gear from the film winding shaft which lies parallel to the longitudinal axis of the cylinders.

A still further novel feature of the invention is that the shaft for the adjustment of the inner cylinder for forming the slot is extending through the rear side (the service side) of the camera so that the slot adjustment may be performed in a very exact manner by a very simple manual setting.

Further details and other features of the invention can be derived from the disclosure and the figures.

Referring now to the drawings, wherein like reference numerals designate like or corresponding parts throughout the several views, there is shown in Fig. 1 a camera housing 1 to which an objective 2 is attached. Inside of the camera housing 1 is located specular optical means, such as for example, a prism 3 with its specular or reflecting face 4, which diverts or deviates light rays 5 coming from the subject being photographed approximately 90°, whereupon these light rays pass through the opened slot of the shutter onto a film strip 6 for the purpose of effectuating a photographic exposure.

The prism 3 is fastened to a holder or support 7 which is screwed onto the inside of camera housing 1. The film strip 6 is unwound from a film holder 8 over a film guide roller 9 onto film holder 10 by means of a film movement knob 11 (see Fig. 2).

The shutter, which is located inside of the camera housing 1, comprises two cup-shaped cylindrical shells or tubes 20 and 30. The outer cylindrical shell 30, which has a hollow shaft 31, is pivotally arranged on the rear wall of the camera housing 1 and secured by means of a nut or threaded ring 32. The inner cylindrical shell 20 is fixed to an axle or shaft 21, which is rotatably arranged within the hollow shaft 31. On shaft 21 is fastened a knob 22, to be used for setting of exposure time. The aforementioned shells 20 and 30 are each provided with a window-like opening 23 and 33, respectively, which serve to admit light rays coming from the objective 2. On the forward wall 34 of the outer shell 30 are located a plurality of bored holes 35 (see Figs. 1 and 3–7) into one of which is registered, according to the desired width of shutter slot opening, a stud 25 which is fastened onto the end wall 24 of the inner shell 20 (see Fig. 1).

On the inner back wall of the camera housing 1 is located a trunnion or journal 12, on which a sprocket or gear 13 is rotatably arranged. To secure the gear 13 against axial movement, a nut or threaded ring 14 is threaded onto trunnion 12. Between gear 13 and trunnion 12 is provided a free wheeling device 130, of known function, by which it is possible to make the gear 13 rotatable in only one rotational direction. Thus, in the direction of and during the winding or setting of the shutter, the gear 13 will rotate, but during the shutter return, gear 13 will be held fast by means of the free wheeling device 130. Between the gear 13 and the outer cylindrical shell 30 is located a torsion spring 15, of which one end 16 is fastened to gear 13, while the other end 17 thereof is fastened onto the forward wall 34 of the shell 30.

Figure 2:
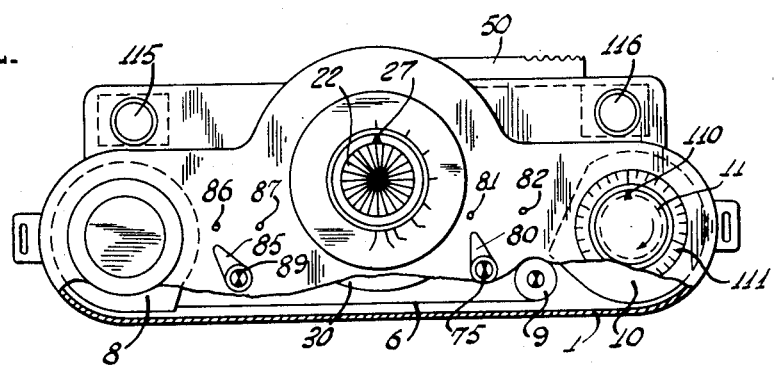
Fig. 2 is a bottom view of the camera of Fig. 1, shown partially cut away.
Figure 3:
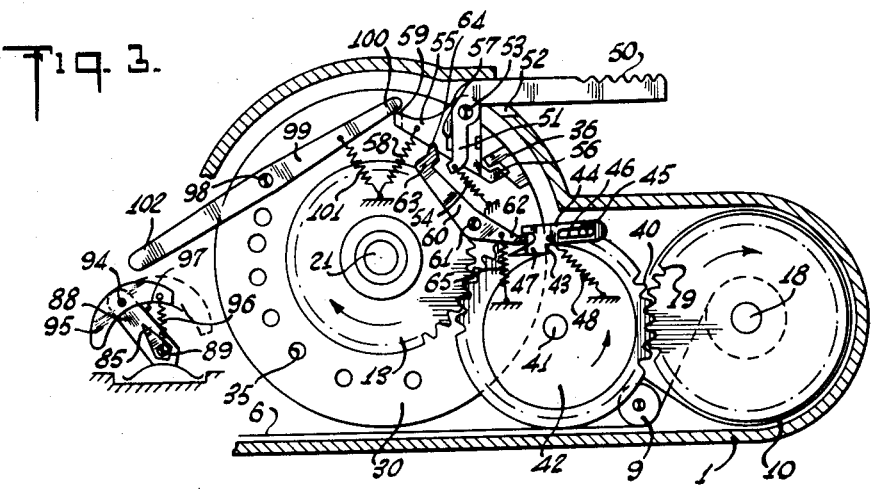
Fig. 3 is a fragmentary sectional plan view of the camera showing the shutter mechanism in wound or cocked position.
Figure 4:
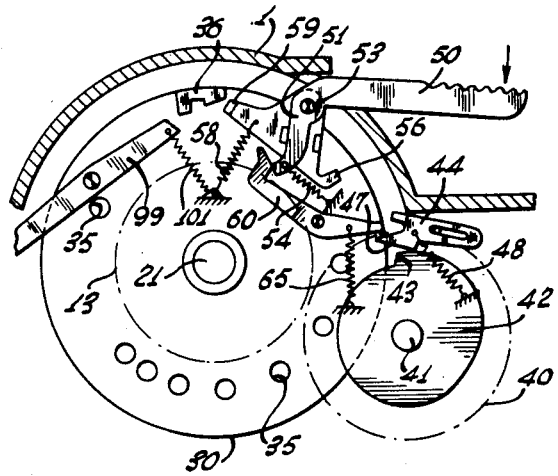
Fig. 4 is a view similar to Fig. 3 but with the shutter in unwound position after an exposure, with the release lever in releasing position.

According to Fig. 3, a gear 19 is fastened onto the shaft 18, which is connected to the film movement knob 11 (Fig. 2). The two gears 19 and 13 are operably connected through an intermediate gear 40, which with its shaft 41 is rotatably arranged inside of the camera housing 1. Securely joined to gear 40 as well as with shaft 41 is a cam 42, which operates in combination with a click or locking pawl 44 and a locking lever 60 in order to prevent double exposures and non-exposures.

Pivoted about a pivot pin 53 on the camera housing 1 is a lever-like formed shutter release member 50, which with its angular end 51 projects through an opening 52 into the camera housing 1. About this pivot pin 53 is also mounted a two-armed locking lever 55, freely rotatable thereon.

The operation of the slotted shutter mechanism according to the invention is as follows: By use of a light meter (photometer) or by means of tables, the exposure time is determined and set, according to Figs. 1 and 2, by means of an arrangement on the back side of the camera. By pressing in knob 22 against the pressure of a spring 26, inner shell 20 is slid forwardly by its shaft 21 sliding in hollow axle 31, and with such forward movement stud 25, which is fastened so as to project rearwardly from the rear wall of the inner shell 20, will also be moved forwardly and out of one of the bored holes 35 located in wall 34 of the outer cylindrical shell 30. The two shells 20 and 30 are thus disconnected from each other.

The knob 22, which carries indicator mark 27 is then adjusted, i.e. rotated, to the desired time marking, for example, to the exposure time mark designating one second. By this rotation of the knob 22, the inner cylindrical shell 20 becomes re-positioned in relation to the outer shell 30 and therewith the size of the opening formed by the two overlapping window-like cut-out portions 23 and 33 changes. After setting it to a desired exposure time, the knob 22 is again released against the outward thrusting pressure of compressed spring 26, and the stud 25 becomes registered within a predetermined one of the holes 35; and thus the interlocking of the two cylindrical shells 20 and 30 is again achieved.

Winding or cocking of the shutter occurs in the following manner. By turning the knob 11 in the direction of the arrow (see Figures 2 and 3) the film strip 6 of the film holder 8 is spooled into the film holder 10. By this rotation of knob 11 the gear 19 is also simultaneously moved and in turn drives the two gears 40 and 13. As already fully described above, gear 13 is joined with the outer cylindrical shell 30 through a torsion spring 15. When the gears 19, 40 and 13 are mutually rotated, the spring 15 would also tend to rotate together therewith, except for the fact that it is held fast by being fastened against the stationarily held shell 30, and thus becomes torsionally wound. The outer cylindrical shell rotates by reason of transmitted rotary motion from the spring 15 just so far until the two-armed locking lever 55 with its projecting dog 56 halts the shell 30 by engaging the notch of stop 36 located on shell 30.

During the film movement and simultaneous shutter tensioning or cocking, there occurs still a further driven action, namely the disengagement of shutter release member 50, which was detained, as may be seen in Fig. 5, by means of the locking lever 60 for the purpose of preventing an undesired double exposure. According to Fig. 5, the click or locking pawl 44 is slidably and rotatably positioned with its elongated slot 46 on a pin 45, and with its shoulder 47 urged against the cam 42 by reason of the extension of a tension spring 48. When the gear 40 is rotated during the film movement and shutter setting, cam 42, which is securely joined to gear 40, also rotates and in the direction of the arrow of Fig. 5 just so far until the projection 43 on cam 42 comes into position in front of the shoulder 47 of the click 44. Shortly before the completion of the film movement and simultaneous shutter winding—the film movement knob 11 requires a full turn for an entire film movement or for the complete cocking of the shutter—the projection 43 on cam 42 pushes the click 44 towards the left until click 44 reaches the extreme end position shown in Fig. 3. During this motion the locking lever 60 is swung in a clockwise direction about the pivot pin 61. Thereafter locking lever 60, the right lever end 62 of which lies urged against the inclined or sloping surface 49 of click 44 by means of the stressed spring 65, is swung (see Fig. 5) about pivot pin 61 during the side displacement of click 44 in the direction of the arrow shown, until the left end 63 of lever 60 frees the angular end of the shutter release member 50 (see Fig. 3). A manipulation of these release members for a new picture exposure is now again possible.

Should an exposure follow, then the locking lever 60 and the two-armed locking lever 55 become simultaneously actuated through the angular lever end 51 on the shutter release member 50, due to the forcing down of the shutter release member 50 by the force of a spring 54 (see Fig. 3).

The angular lever end 51 presses against the inclined surface 64 of the locking lever 60 during the actuation of the release member 50 and swings locking lever 60 in a counter-clockwise direction about pivot pin 61, thereby deviating the right lever end 62 against the force of a spring 48 of the click 44 in a clockwise direction about the pin 45, until the projection 43 of cam 42 no longer lies in blocking position before the shoulder 47 of the click 44. In this moment the spring 48 draws the click 44 to the right, sliding it by means of the slot 46 along the pin 45, until the shoulder 47 comes to rest above the projection 43 of cam 42 by reason of the pull of spring 48 (see Fig. 4).

According to Fig. 3, the angular lever end 51, during the operation of the release lever 50, presses not only against the above-described inclined surface 64 of the locking lever 60, but also at the same time against the projection 57, which is located on the two-armed locking lever 55, and deviates the latter in a clockwise direction against the force of a spring 58. During this deviating action the projection or dog 56 of locking lever 55 moves away from the stop 36 located on the forward wall 34 of the outer cylindrical shell 30, so that the two cylindrical shells 20 and 30, joined through stud 25, return very rapidly in a clockwise direction by reason of the stressed torsion spring 15 (see Fig. 1). The cylindrical shells 20 and 30, with their window-like cut-outs 23 and 33 rotate about the ray diffracting prism 3, and as the cut-out openings 23 and 33 pass prism 3 they afford an ingress or entry opening for the light rays coming from the subject being photographed, whereupon the photosensitive coating on the film strip 6 becomes exposed. The openings 23 and 33 then continue to rotate past the prism 3, and the shells 20 and 30 rotate further until stop 36, situated on the outer shell 30, arrives within the vicinity of the left lever end 59 of locking lever 55 (see Fig. 4). If the shells 20 and 30 were not arrested by the continued pressing down of the release member 50 through the aforementioned halting arrangement 36/56, there would be no possibility of arresting the shells 20 and 30 with the locking device 36/56. By reason of the aforementioned halting device 36/56 the shells 20 and 30 are retained so long, until after the manual release of shutter release member 50, which then returns, through the action of spring 54, back to its original starting position according to Fig. 5, so that the two shells 20 and 30 can rotate further, causing the stop 36 to arrive into the vicinity of the projection 56 of the locking lever 55. The cylindrical shells 20 and 30 are then thus securely retained in position until the next complete film movement and simultaneous shutter cocking. Before a full film movement or shutter cocking is completed, by reason of the structure and functions above set forth in detail, an additional manual or other pressing down of the release member 50 is impossible. During the shutter return, the gears 13, 40 and 19 do not rotate because of the unidirectional free wheeling device located between the gear 13 and the shaft 12.

The preceding described embodiments relate to a shutter setting where the shutter return takes place without a brake mechanism. For long shutter times, however, for example, for 1/5 second or more, the retarding control of a time brake is necessary. Brake mechanisms for slotted shutters are known, and the structural details of the brake itself are not the subject of the present invention. However, for explanation of a shutter return with a brake, the action of the present slotted cylindrical shutter working together with a known type of brake mechanism is set forth and described below.

Figure 7:
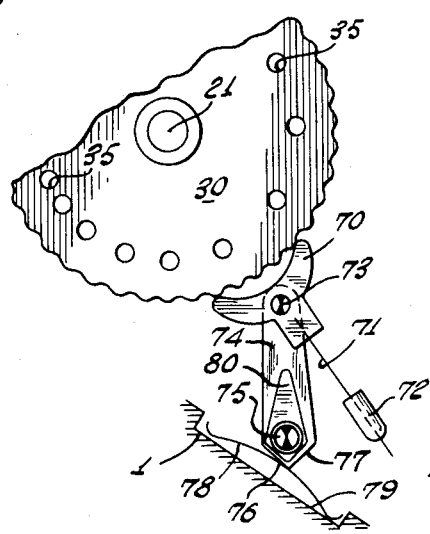
Fig. 7 is a view of a brake mechanism in combination with the cylindrical shell, according to another embodiment of the invention.

In Fig. 7 is shown a fragmentary view of an embodiment in which the circumference of the brake mechanism wheel is formed in a wavy or rippled manner as several interlocking sine curves around the circumference of the cylindrical shell 30. An escapement anchor 70, provided with an oscillatory and adjustable weight 72 on a resilient steel band 71, is freely movable about a pivot pin 73. The escapement anchor 70 with its pivot pin 73 are arranged on a single-armed lever 74. Lever 74, which is swingably positioned on a bolt 75 located in the rear wall of the camera housing 1, has two inclined surfaces 76 and 77 at one end thereof, of which one surface 76 is pressed during the escapement anchor's ready-to-operate position, against a steel ribbon spring 78, which is arranged in a trough-shaped cut-out portion or recess 79 on the inside of the camera housing 1. The changing over of the escapement anchor 70 from its ready-to-operate position against the circumference of shell 30 to the non-operating position, i.e. to the position in which the slotted shutter is to work without the brake mechanism, occurs by means of the selector finger-piece or trigger 80 which is securely joined to the lever 74. On the rear wall of the camera housing 1 are located two marks 81 and 82. In Fig. 2 the selector trigger 80 is shown in the position in which the slotted shutter is to operate with the brake mechanism. The control device with the two surfaces 76 and 77, and spring 78 works in a manner similar to known principles of a toggle switch in electrical engineering. If the selector trigger 80 is turned toward mark 82, the present slotted shutter arrangement works without the brake mechanism. This type of operation is necessary for short exposure times, for example, for exposure times of 1/50 of a second, 1/100 of a second or still shorter.

Should picture-taking with very long exposure times occur, then the shutter is adjusted in a known manner onto the time mark "Bulb," indicated by "B" on the shutter or camera. The shutter return in such cases takes place in the following manner. Through the operation of the release member 50 and during the continued manual or other depression thereof, the shutter shells 20 and 30 are freed so that the shells with their window-like cut-out openings 23 and 33 rotate about the prism 3. In the instant of time where the largest opening of the cut-outs 23 and 33 is located between the prism 3 and the film strip 6, the rotary motion of the shells 20 and 30 is halted by means of a stopping linkage controlled from release member 50, and remains in stationary position so long as the shutter release member 50 remains pressed down. At the instant of release of the release member 50, the shells 20 and 30 rotate further with their window-like cut-outs 23 and 33, and the exposure on the film strip 6 becomes thereby discontinued.

Figures 3 and 6 show the arrangement for the attachable bulb time arrangement hereinafter described. According to both Figures 2 and 3 the selector fingerpiece or trigger 85 is shown in the selective position on adjustment mark 86, in which position the device for the bulb time is not in activity. Upon changing over of the selector trigger 85 onto mark 87, the said bulb-time stopping device arrives at its ready-to-work position (see Fig. 6 and the position indicated in dash line in Fig. 3). The change-over mechanism for the bulb-time stopping device operates on the same toggle switch principal as that already described above in connection with the braking device of Fig. 7. On the bottom end of lever 88 are located two inclined surfaces 90 and 91, of which, as shown in Fig. 6, the surface 91 presses against a steel ribbon spring 92, arranged in a trough-shaped recess 93 on the inside of the camera housing 1. On the upper end of lever 88 is a double-armed lever 95 rotatably positioned on a pivot pin 94. The bulb-time locking member or lever 95, in its non-operating position, rests against a projection 97 by means of a tension spring 96 (see Fig. 3).

Inside of the camera housing 1 is a two-armed lever 99, arranged to pivot about a pivot pin 98, which may be fastened, for example, on the inner rear wall of the camera housing 1. Lever 99 projects with its right lever end 100 into the vicinity of the left lever end 59 of locking lever 55. By means of a tension spring 101 the lever end 100 is pressed against the lever end 59. The left lever end 102 is located in the immediate vicinity of the double-armed lever 95.

After the selector trigger 85 is deviated over onto the mark 87 for bulb-time (see Fig. 6 as well as the dash-line position indicated in Fig. 3) and the shutter release member 50 is pressed down, as already described above in detail, this depressing of the projection 56 of locking lever 55 frees the stop 36 so that both of the cylindrical shells 20 and 30 start to turn by reason of the previously stressed torsion spring 15 (see Fig. 1). While the projection 56 of the cylindrical shells 20 and 30 is being freed for causing the exposure to take place, simultaneous therewith, by means of the lever end 59 of locking lever 55, lever 99 is pivoted in a counter-clockwise direction about the pivot pin 98. During this pivoting motion the lever end 102 presses on the left side of the double-armed lever 95, deviating that lever also in a counter-clockwise direction and against the force of a spring 96, so that the right side of the double-armed lever 95 arrives into the return path of stop 36. Thus, after the cylindrical shells 20 and 30 are freed for their return, they are held back from further rotation by means of the cooperation between stop 36 and double-armed lever 95 (see Fig. 6) for that moment of time in which the window-like cut-outs 23 and 33 are in position between prism 3 and the film strip 6. This condition lasts as long as the shutter release member 50 remains depressed, and thus the light coming from the subject being photographed can react unhindered during that time on the photosensitive coating of the film strip 6. As soon as the release member 50 is released from its depressed position, locking lever 55 and the two-armed lever 99 are swung toward each other by means of the springs 58 and 101. The lever end 102 swings clockwise until it no longer presses against the double-armed lever 95, so that by the action of spring 96, lever 95 is pulled out of the return path of stop 36. The two cylindrical shells 20 and 30 can now rotate further, and the exposure action is thereby discontinued. Stop 36 then continues to rotate into the vicinity of projection 56, where the shells 20 and 30 are restored to their original starting position and are retained until the next complete film movement and simultaneous shutter setting.

To complete the description, other elements of the camera are further illustrated and described. In Figure 2 is shown the film movement knob 11, which has on it a fixed mark 110 rotating about a film exposure counting dial 111. Also, it is expedient to mark the various time groups, i.e. long or short exposure times, in various colors, for example, red, blue and white. The finder device is the present embodiment is constructed, as shown in Fig. 2, as a binocular finder 115 and 116, located above the camera housing 1.

Obviously, many modifications and variations of the present invention are possible in the light of the above teachings. It is, therefore, to be understood that within the scope of the appended claims the invention may be practiced otherwise than as specifically described.

Having thus described the invention, what is claimed as new and desired to be secured by Letters Patent is:

1. A slotted cylindrical shutter for picture cameras having an objective lens mounted on the forward side thereof, comprising a plurality of cylindrical coaxial substantially cup-shaped tubes encased in one another and arranged to be jointly rotatable and rotatably adjustable in relation to each other with said tubes each having a window like opening in the circumference thereof and having respective coaxial shafts parallel to the axis of said objective lens, optical means stationarily located within said cylindrical tubes for deviating light rays to pass through said openings in said tubes and onto a photosensitive material, said cylindrical tubes and shafts being mutually axially shiftable, the shaft of the innermost one of said tubes leading rearwardly out to the rear side of said camera for serving to axially shift and rotatably position said innermost tube and adjust the position of said opening in the circumference of said innermost tube in overlapping relation to an opening in another one of said tubes, at least one peg fixedly attached to one of said cup-shaped tubes and protruding therefrom, another of said tubes having a plurality of circumferentially disposed holes for receiving said peg during the axial shifting of said innermost tube, thereby releasably directly joining said cylindrical tubes for variable mutual angular adjustment and for jointly rotating said tubes in the same direction during each picture exposure, locking means and release means for respectively halting and releasing the rotary joint motion of said cylindrical tubes, means for preventing more than one revolution of said cylindrical tubes after each actuation of said release means, a bulb-time stopping device comprising a stop located on one of said cylindrical tubes and positioned to rotate therewith, a bulb-time locking member mounted for selective actuation into and out of the path of rotation of said stop, and a lever pivotally mounted for actuation by said release means for actuating said bulb-time locking member into said path for rotation of said stop, whereby the bulb exposure time halting the rotation of said cylindrical tube and of the openings therein can be maintained by continuously depressing said release means to cause joint rotation of said tubes by said torsion spring until said stop rotates into contact with said bulb-time locking member, and whereby cessation of depression of said release means will swing said pivotally mounted lever to cause said locking member to move out of the path of rotation of said stop, thereby discontinuing said bulb exposure time.

2. A slotted cylindrical shutter for picture cameras having an objective lens mounted on the forward side thereof, comprising a plurality of cylindrical substantially cup-shaped coaxial tubes encased in one another and arranged to be jointly rotatable and rotatably adjustable in relation to each other, said tubes each having a window-like opening in the circumference thereof and having respective coaxially arranged shafts lying parallel to the axis of said objective lens, optical means stationarily located within said cylindrical tubes for deviating light rays to pass through said openings in said tubes and onto a photosensitive material, said cylindrical tubes and shafts being mutually axially shiftable, the shaft of the innermost tube leading rearwardly out of the rear side of said camera for axially shifting and rotatably positioning said innermost tube and adjusting the position of said opening in the circumference of said innermost tube in overlapping relation to an opening in another one of said tubes, at least one peg fixedly attached to one end of said cup-shaped tubes and protruding therefrom, another of said tubes having a plurality of holes arranged circumferentially for selectively receiving said peg during the axial shifting of said innermost tube, thereby releasably directly joining said cylindrical tubes for variable mutual angular adjustment and for jointly rotating said tubes in the same direction during each picture exposure, locking means and release means for respectively halting and releasing the rotary joint motion of said cylindrical tubes, means for preventing more than one revolution of said cylindrical tubes after each actuation of said release means, said release means including a shutter release member rotatably mounted on the housing of said camera, said shutter release member having an angularly shaped lever end located within said camera, a rotary cam having a step projection in the surface thereof and geared to complete one full rotation simultaneous with one film advance of said camera, a slidable rotatable locking pawl engageable with said step projection of said cam, said locking means including a pivotable locking lever, one end of said locking lever in one position thereof being in contacting proximity with said angularly shaped lever and a second end of said locking lever in another position of said locking lever being in contacting proximity with said locking pawl, whereby said shutter release member will be retained in its non-depressed position by said one end of said locking lever until said locking pawl is lifted out of its locking position on said cam by said other end of said locking lever only after a full film movement and simultaneous rotation of said cam.

3. A slotted cylindrical shutter for picture cameras having an objective lens mounted on the forward side thereof, comprising a plurality of cylindrical substantially cup-shaped tubes coaxially encased in one another and arranged to be jointly rotatable and rotatably adjustable in relation to each other, said tubes each being provided with a window-like opening in the circumference thereof and having respective coaxially arranged shafts parallel to the axis of said objective lens, optical means stationarily located within said cylindrical tubes for deviating light rays to pass through said opening in said tubes and to direct said light rays to a photosensitive material, said cylindrical tubes and shafts being mutually axially shiftable, said respective shaft pertaining to an innermost one of said tubes leading rearwardly out of the rear side of said camera for axially shifting and rotatably positioning said innermost tube and adjusting the position of said opening in the circumference of said innermost tube in overlapping relation to other openings in another one of said tubes, at least one projection fixedly attached to one end of said cup-shaped tubes and protruding therefrom, another one of said tubes having a plurality of angularly spaced holes arranged for selectively receiving said projection during axial shifting of said innermost tube, thereby releasably directly joining said cylindrical tubes for variable mutual angular adjustment and for jointly rotating said tubes in the same direction during each picture, said tubes being releasably and directly joined for variable mutual angular adjustment over a wide angular range of up to 170°, said window-like opening in the circumference of said tubes extending over an angle of 170° when said tubes are angularly adjusted with respect to one another to their maximum adjustment, whereby the exposure time may be varied over a large time period, torsional resilient means connected to said tubes for rotating said tubes during exposure in only one angular direction.

4. A slotted cylindrical shutter in accordance with claim 3, including locking means and release means for respectively halting and releasing the rotary joint motion of said cylindrical tubes, and means for preventing more than one joint revolution of said cylindrical tubes after each actuation of said release means.

5. A slotted cylindrical shutter in accordance with claim 4, including a bulb-time stopping device comprising a stop located on one of said cylindrical tubes and positioned to rotate therewith, a bulb-time locking member mounted for selective acutation into and out of the path of rotation of said stop, and a lever pivotally mounted for actuation by said release means and for actuating said bulb-time locking member into said path of rotation of said stop, whereby bulb exposure time halting the rotation of said cylindrical tube and of the openings therein can be maintained by continuously depressing said release means to cause joint rotation of said tubes by said torsional resilient means until said stop rotates into contact with said bulb-time locking member, and whereby cessation of said depressing of said release means will swing said pivotally mounted lever to cause said locking member to move out of the path of rotation of said stop, thereby discontinuing said bulb exposure time.

6. A slotted cylindrical shutter in accordance with claim 4, said release means including a shutter release member rotatably mounted on the housing of said camera, said shutter release member having an angularly shaped lever end located within said camera, a rotary cam having a stepped projection in the surface thereof and geared to complete one full rotation simultaneous with one film advance of said camera, a slidable and rotatable locking pawl engageable with said stepped projection of said camera, said locking means including a pivotable locking lever, one end of said locking lever in one position thereof being in contacting proximity with said angularly shaped lever end and a second end of said locking lever in another position of said locking lever being in contacting proximity with said locking pawl, whereby said shutter release member will be retained in its non-depressed position by said one end of said locking lever until said locking pawl is lifted out of its locking position on said cam by said other end of said locking lever only after a full film movement and simultaneous rotation of said cam.

7. A picture camera comprising an objective lens mounted on the forward side thereof, a slotted cylindrical shutter having two cylindrical substantially cup-shaped drums encased in one another and arranged to be jointly rotatable and rotatably adjustable in relation to each other with their mutual axis lying parallel to that of said objective lens, said drums each being provided with a window-like opening in the circumference thereof and having respective coaxially arranged shafts, optical means stationarily located within said cylindrical drums for deviating light rays to pass through said openings in said drums and to direct said light rays onto a photosensitive material, drive means for rotating said cylindrical shutter, a brake mechanism for retarding the shutter return movement of said cylindrical drums comprising a brake wheel having a wavy circumferential surface fixedly attached to one of said drums, a lever pivotally mounted near one end of same in said camera for movement toward and away from said brake wheel, escapement means arranged for engaging the wavy circumference of said wheel, said escapement means being swingingly attached to the other end of said lever, and toggle means cooperating with said one end of said lever for restraining movement of said lever and for selectively moving said escapement means optionally into engaging and disengaging position against said brake wheel.

8. In a camera, a slotted cylindrical shutter which is capable of being adjusted comprising a first cup-shaped cylindrical member having a first window-like opening along the circular periphery of said member, a second cup-shaped cylindrical member coaxially disposed within said first cylindrical member so that the bases of the members are adjacent and having a second window-like opening along the circular periphery of said member, said openings being capable of alignment by respective rotation of said members, said openings when aligned extending over an angular range of up to 170°, means for axially displacing said members with respect to one another, resilient means for biasing the bases of said cup-shaped members against each other; means for directly and releasably coupling said members so as to be adjustable with respect to one another, said means including a peg extending from the base of one of said members toward the other of said members, the base of the other of said members having a plurality of angularly spaced holes each adapted to receive said peg in response to the biasing of said resilient means, whereby said displacing means are capable of disengaging said peg from one of the holes and after rotation of said members with respect to each other said peg may engage another of said holes so as to vary the angular alignment of said openings and directly and releasably couple the members; and means for rotating one of the members whereby as a result of the peg both are rotated together so as to expose a film in the camera.

References Cited in the file of this patent

UNITED STATES PATENTS

| | | |
|---|---|---|
| 943,253 | Meredith-Jones | Dec. 14, 1909 |
| 1,000,343 | Plant | Aug. 8, 1911 |
| 1,997,130 | Weisse | Apr. 9, 1935 |
| 2,119,200 | Campbell | May 31, 1938 |
| 2,723,609 | Flora | Nov. 15, 1955 |
| 2,835,178 | Montremy | May 20, 1958 |

FOREIGN PATENTS

| | | |
|---|---|---|
| 876,196 | Germany | May 11, 1953 |